March 11, 1924.  
H. J. FISHER  
TRAFFIC SIGNAL FOR MOTOR VEHICLES  
Filed April 13, 1923  
1,486,571  
2 Sheets-Sheet 1
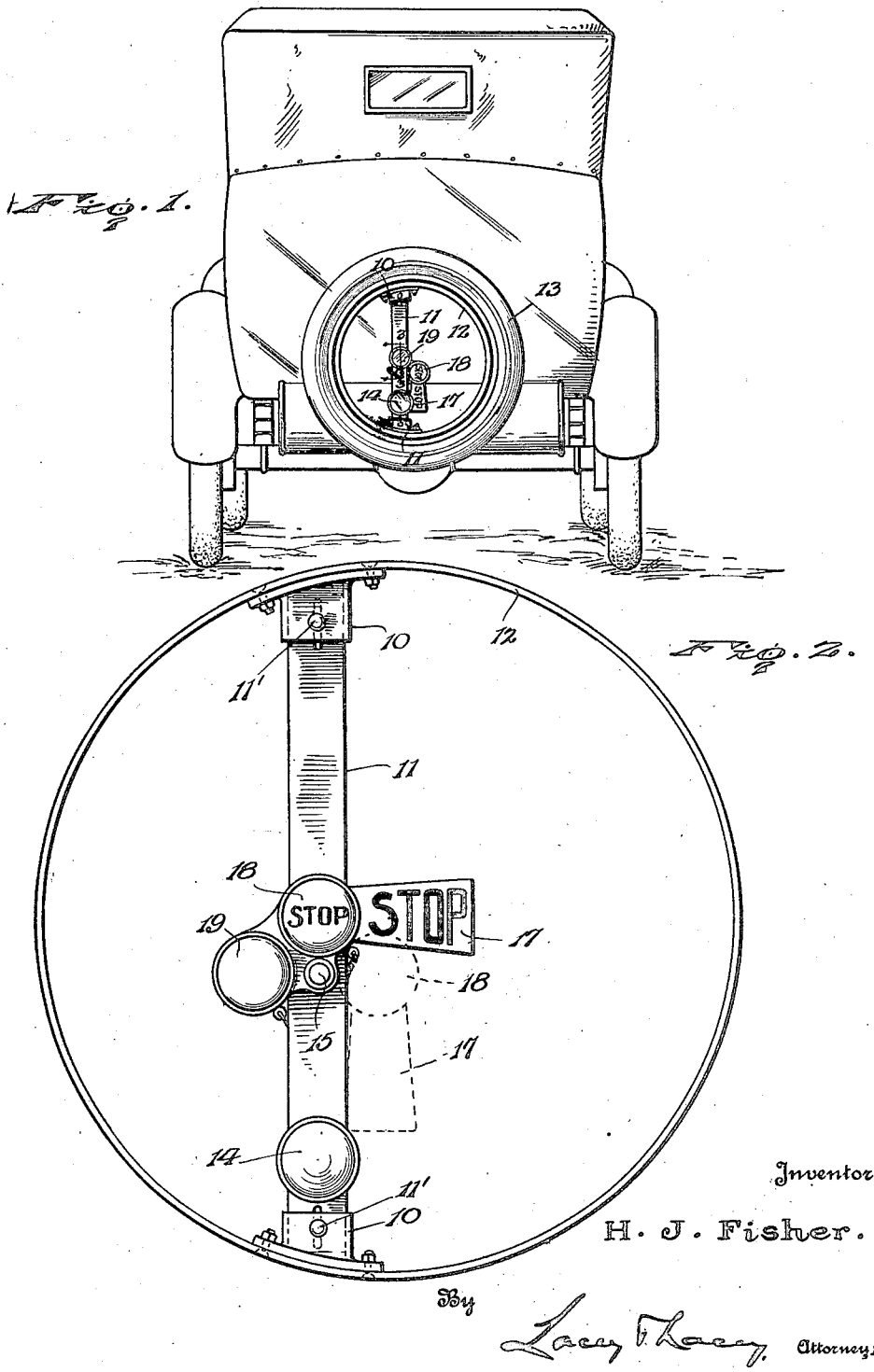
Inventor  
H. J. Fisher.  
By Lacy & Lacy, Attorneys March 11, 1924.
H. J. FISHER
1,486,571
TRAFFIC SIGNAL FOR MOTOR VEHICLES
Filed April 13, 1923    2 Sheets-Sheet 2
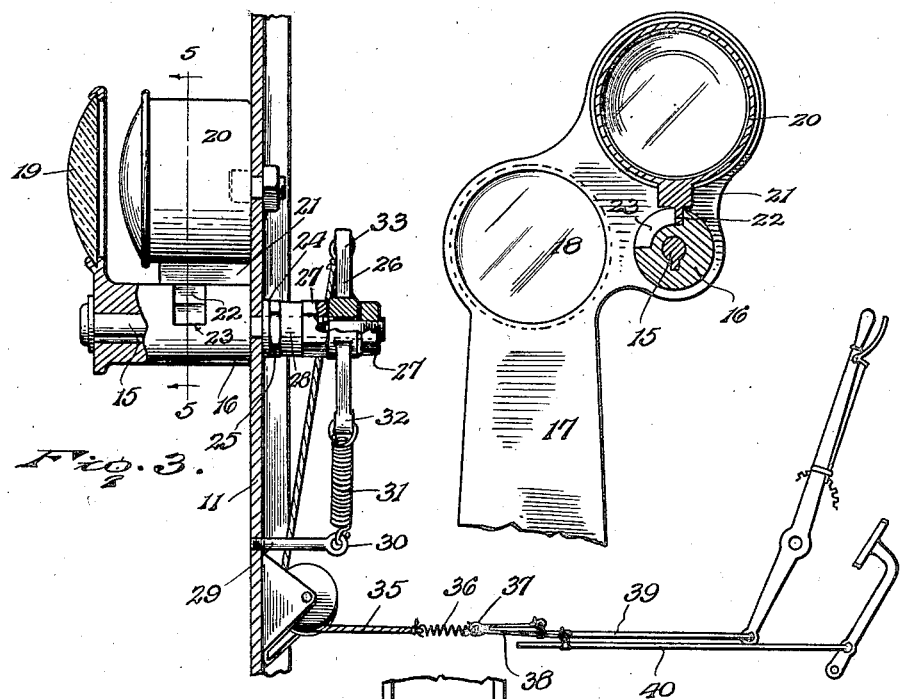
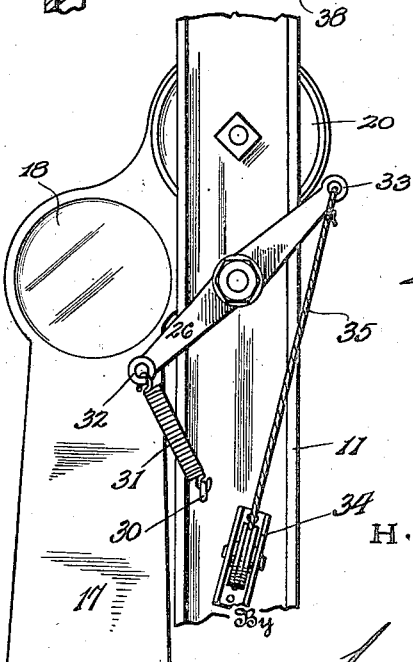
Inventor
H. J. Fisher.

Patented Mar. 11, 1924.

1,486,571

UNITED STATES PATENT OFFICE.

HOWARD J. FISHER, OF CRESTLINE, OHIO.

TRAFFIC SIGNAL FOR MOTOR VEHICLES.

Application filed April 13, 1923. Serial No. 631,876.

*To all whom it may concern:*

Be it known that I, HOWARD J. FISHER, citizen of the United States, residing at Crestline, in the county of Crawford and State of Ohio, have invented certain new and useful Improvements in Traffic Signals for Motor Vehicles, of which the following is a specification.

This invention relates to an improved traffic signal for motor vehicles and seeks, among other objects, to provide a simple and efficient device for automatically displaying a stop signal when the vehicle brake is applied for stopping the vehicle.

The invention seeks, as a further object, to provide a device which may be readily mounted upon the ordinary tire carrier of the vehicle and will thus be supported in the rear of the vehicle in easy view.

And the invention seeks, as a still further object, to provide a device which will be operated not only by the brake pedal of the vehicle but which will also be connected with the emergency brake lever of the vehicle to be also operated through the medium of said lever.

Other and incidental objects will appear hereinafter.

In the drawings:

Figure 1 is a rear elevation showing my improved device applied,

Figure 2 is an enlarged rear elevation of the device,

Figure 3 is an enlarged vertical sectional view on the line 3—3 of Figure 1, looking in the direction of the arrows, Figure 4 is a fragmentary elevation looking at the inner side of the device, and Figure 5 is a detail sectional view on the line 5—5 of Figure 3, looking in the direction of the arrows.

In carrying the invention into effect, I employ companion clamps 10 which are shaped to fit a tire holder, as conventionally illustrated at 12 and are bolted thereto. I have shown the carrier as comprising the customary ring or annular band which is mounted at the rear of the vehicle, as suggested in Figure 1, for removably supporting a tire, as conventionally illustrated at 13. Mounted upon the clamps 10 is a body bar 11 slotted near its ends to receive bolts 11' connecting the bar with the clamps and suitably fixed to the bar near its lower end is an appropriate tail lamp 14. Journaled through the bar above said lamp is a shaft 15 upon which is removably secured a sleeve 16. Integrally formed on or otherwise connected with the sleeve is a semaphore blade 17 preferably carrying the word Stop and associated with the blade are red and green colored lenses 18 and 19 respectively. Appropriately secured to the body bar above the shaft 15 is a signal lamp 20 and formed on the casing of the lamp at its lower side is a rib 21 from which depends a stop lug 22 freely received in a segmental slot 23 in the sleeve.

Surrounding the shaft 15 at the inner side of the body bar 11 is a washer 24 and threaded upon the shaft to seat against the washer is a nut 25 rotatably connecting the shaft with the body bar. At its inner end, the shaft carries a lever 26 suitably fixed to the shaft and removably held thereon by nuts 27 at opposite sides of the lever, a spacer 28 being employed between the innermost of the nuts 27 and the nut 25. Mounted upon the bar 11 to extend inwardly therefrom is a post 29 on which is formed an eye 30 and engaged at one end with said eye is a spring 31. At its ends, the lever 26 is formed with eyes 32 and 33 and, as will be observed, the upper end of the spring is engaged through the eye 32 so that the spring will function to normally hold the blade 17 in a downward position. Mounted upon the body bar slightly below the plane of the post 29 is an appropriate pulley 34 and trained around said pulley is a flexible cable 35, one end of which is attached to the eye 33 of the lever. Attached to the opposite end of the cable is a spring 36 carrying a ring 37 and slidable through said ring is a short length of flexible cable 38 one end of which is, as shown in Figure 3, suitably attached to the emergency brake lever rod of the vehicle, as conventionally illustrated at 39, while the opposite end of said cable is similarly attached to the brake pedal rod of the vehicle, as conventionally illustrated at 40, the cable 38 thus forming a bridle operatively connecting the cable 35 with both of said rods.

The signal lamp 20 may be supplied with current from the storage battery of the vehicle or other suitable source of electrical energy thereon so that, as will now be seen in view of the foregoing, the green lens 19 will, since the spring 31 will normally hold the semaphore blade in a downward position, be disposed in front of said lamp for displaying a clear signal at the rear of the vehicle indicating that the driver intends to proceed straight ahead. On the other hand, when the driver rocks the foot pedal of the vehicle for applying the vehicle brake, the lever 26 will, as will be appreciated, be rocked by the cable 35 for swinging the semaphore blade upwardly, as shown in Figure 2, to horizontal position while the lens 18 will be brought opposite the lamp 20 so that a red signal light will also be displayed. A similar result will, of course, follow when the emergency brake lever of the vehicle is rocked for stopping the vehicle, the spring 36 being provided to accommodate movement of the foot pedal or brake lever after the semaphore blade has been swung upwardly and, in this connection, it will be noted that the stop lug 22 will engage the end walls of the slot 23 in the sleeve 16 for limiting the blade in its movement in opposite directions. Upon release of the foot pedal or brake lever, as the case may be, the spring 31 will, of course, return the semaphore blade to its normal position.

Having thus described the invention, what is claimed as new is:

1. In a traffic signal, the combination of a circular tire carrier, clamps secured upon the inner circumference of the tire carrier, a bar extending between said clamps and having longitudinal slots at its ends, securing bolts inserted through said slots and the clamps, a swingingly mounted semaphore blade carried by the bar, and means for swinging said blade.

2. A traffic signal including a body bar, means for securing said bar upon a vehicle a shaft journaled on said bar, a sleeve fixed to said shaft and provided with a semaphore blade, a lever carried by one end of the shaft, a spring attached to the bar and one end of the lever for normally holding the semaphore blade in downward inactive position, and means attached to the opposite end of the lever for swinging the blade upwardly to active position, said means including a bridle for operative connection with a foot pedal and emergency brake lever.

3. A traffic signal including a body bar, means for securing said bar upon a vehicle a shaft journaled on said bar, a sleeve secured upon the shaft and provided with a semaphore blade and with a lens, the sleeve being formed with a circumferential slot, a signaling lamp upon the bar adjacent the shaft, a lug extending from the lamp into the slot in the sleeve to engage the end walls thereof and limit the turning movement of the sleeve and shaft, and means for rocking the shaft and sleeve to dispose the lens in front of the lamp.

In testimony whereof I affix my signature.

HOWARD J. FISHER. [L. S.]